United States Patent
Holmdahl et al.

(10) Patent No.: US 12,216,619 B2
(45) Date of Patent: Feb. 4, 2025

(54) AUTOMATED GENERATION OF GAME TAGS

(71) Applicant: Roblox Corporation, San Mateo, CA (US)

(72) Inventors: Eric Holmdahl, San Francisco, CA (US); Nikolaus Sonntag, Foster City, CA (US); Aswath Manoharan, Sunnyvale, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 18/376,021

(22) Filed: Oct. 3, 2023

(65) Prior Publication Data

US 2024/0028562 A1 Jan. 25, 2024

Related U.S. Application Data

(63) Continuation of application No. 16/885,047, filed on May 27, 2020, now Pat. No. 11,789,905.

(51) Int. Cl.
G06F 16/16 (2019.01)
G06N 3/08 (2023.01)

(52) U.S. Cl.
CPC ............ *G06F 16/164* (2019.01); *G06N 3/08* (2013.01)

(58) Field of Classification Search
None
See application file for complete search history.

(56) References Cited

U.S. PATENT DOCUMENTS

| | | |
|---|---|---|
| 8,706,675 B1 | 4/2014 | Samaniego et al. |
| 10,505,726 B1 | 12/2019 | Andon et al. |
| 2012/0053946 A1 | 3/2012 | Bellegarda |
| 2012/0134651 A1 | 5/2012 | Cottrell |
| 2014/0274354 A1 | 9/2014 | George et al. |
| 2016/0019471 A1 | 1/2016 | Shin et al. |
| 2018/0001205 A1 | 1/2018 | Osman et al. |
| 2019/0005043 A1 | 1/2019 | Hemani et al. |

(Continued)

FOREIGN PATENT DOCUMENTS

CN 110536725 A * 12/2019 ........... A63F 13/355

OTHER PUBLICATIONS

KIPO, Notice of Allowance (with English translation) for Korean Patent Application No. 10-2022-7043693, Sep. 19, 2023, 7 pages.

(Continued)

*Primary Examiner* — Hosain T Alam
*Assistant Examiner* — Anthony G Gemignani
(74) *Attorney, Agent, or Firm* — IP Spring

(57) ABSTRACT

Implementations relate to systems, methods, and computer-readable media to generate text tags for games. A computer-implemented method is provided to generate one or more text tags for a game using a trained machine learning model. Data that includes a game identifier of the game and a set of digital assets associated with the game are provided as input to the trained machine learning model. Predicted text tags are generated using the trained machine learning model based on the set of digital assets associated with the game. The text tags are associated with a respective prediction score. One or more text tags are selected from the plurality of predicted text tags based on the respective prediction score.

20 Claims, 9 Drawing Sheets

(56) References Cited

U.S. PATENT DOCUMENTS

2020/0078679 A1    3/2020    Dantas De Castro
2020/0078688 A1*  3/2020    Kaethler ................ G06N 20/20
2020/0118682 A1    4/2020    Villazon-Terrazas et al.

OTHER PUBLICATIONS

Amiriparian, Shahin et al., ""Are you Playing a Shooter Again ?! " Deep Representation Learning for Audio-Based Video Game Genre Recognition", IEEE Transactions on Games, vol. 12, No. 2, 2019, pp. 145-154.
EPO, Extended European Search Report for European Patent Application No. 21814208.1, May 24, 2024, 11 pages.
Suatap, Chayanin et al., "Game Genre Classification from Icon and Screenshot Images Using Convolutional Neural Networks", Proceedings of the 2019 2nd Artificial Intelligence and Cloud Computing Conference, 2019, pp. 51-58.

* cited by examiner

AUTOMATED GENERATION OF GAME TAGS

CROSS-REFERENCE TO RELATED APPLICATIONS

The present application is a continuation application under 35 U.S.C. § 120 of U.S. patent application Ser. No. 16/885,047, filed May 27, 2020 and titled AUTOMATED GENERATION OF GAME TAGS, now U.S. Pat. No. 11,789,905, which is incorporated by reference herein in its entirety.

TECHNICAL FIELD

Embodiments relate generally to computer-based gaming, and more particularly, to methods, systems, and computer readable media to generate text tags for games.

BACKGROUND

Some online gaming platforms allow users to connect with each other, interact with each other (e.g., within a game), create games, and share information with each other via the Internet. Users of online gaming platforms may participate in multiplayer gaming environments (e.g., in virtual three-dimensional environments), design custom gaming environments, design characters and avatars, decorate avatars, exchange virtual items/objects with other users, communicate with other users using audio or text messaging, and so forth.

Users may browse or search for games based on their interests to discover suitable games for playing. For example, users may browse games by categories (e.g., action, racing, puzzle, strategy, popular, trending, new, etc.) or search games by tags, keywords, or concepts (e.g., "car chase, "board game," etc.).

SUMMARY

Implementations described herein relate to generation of text tags for games. In some implementations, a computer-implemented method to generate one or more text tags for a game using a trained machine learning model includes providing, as input to the trained machine learning model, data that includes a game identifier of the game and a set of digital assets associated with the games, generating, using the trained machine learning model and based on the set of digital assets associated with the game, a plurality of predicted text tags, each text tag associated with a respective prediction score, and selecting the one or more text tags from the plurality of predicted text tags based on the respective prediction score.

In some implementations, the set of digital assets includes one or more of game screenshots, game video snippets, game objects, meshes, avatars, game source code, game configuration parameters, game lighting, game level count, avatar movements, text content of the game, chat content generated within the game, game sounds, game background music, code coverage, or a respective frequency of use of digital assets during gameplay.

In some implementations, the one or more text tags are indicative of a type of the game or a style of game play. In some implementations, the method includes validating an existing text tag for the game by comparing the existing text tag with the one or more text tags.

In some implementations, a computer-implemented method to train a machine learning model to generate tags includes providing as input to the machine learning model, data that includes a plurality of game identifiers and a respective set of digital assets associated with each game identified by the game identifiers, generating, by the machine learning model, one or more predicted tags for each game identified by the game identifiers, comparing the one or more predicted tags with respective tags associated with each game identified by the game identifiers, and adjusting one or more parameters of the machine learning model based on the comparison.

In some implementations, the machine learning model includes a neural network and adjusting the one or more parameters of the machine learning model includes adjusting a weight associated with one or more nodes of the neural network or adjusting a weight associated with a link between a pair of nodes of the neural network.

In some implementations, the digital assets include one or more of game screenshots, game video snippets, game objects, meshes, avatars, game source code, game configuration parameters, game lighting, game level count, avatar movements, text content of the game, chat content generated within the game, game sounds, game background music, code coverage, or frequency of use of digital assets during gameplay.

In some implementations, the method further includes generating a respective feature vector for each game identified by the game identifiers based on the respective set of digital assets. In at least some of the implementations, generating the one or more predicted tags by the machine learning model is based on the respective feature vector.

In some implementations, the machine learning model includes one or more input neural networks and an output neural network, and generating the respective feature vector is performed using the one or more input neural networks. In at least some of these implementations, the method further includes providing the respective feature vector as input to the output neural network.

In some implementations, the one or more input neural networks include at least one of: a first input neural network that generates a first portion of the feature vector based on one or more image assets in the digital assets, a second input neural network that generates a second portion of the feature vector based on one or more code assets in the digital assets, a third input neural network that generates a third portion of the feature vector based on one or more text assets in the digital assets, a fourth input neural network that generates a fourth portion of the feature vector based on one or more audio assets in the digital assets, and a fifth input neural network that generates a fifth portion of the feature vector based on one more gameplay assets.

In some implementations, the first input neural network generates the first portion of the feature vector based on one or more image assets in the digital assets, and the one or more image assets include one or more of game screenshots, game video snippets, game objects, meshes, or avatars.

In some implementations, the second input neural network generates the second portion of the feature vector based on one or more code assets in the digital assets, and the code assets include one or more of game source code, game configuration parameters, game lighting, game level count, or avatar movements.

In some implementations, the third input neural network generates the third portion of the feature vector based on one or more text assets in the digital assets, and the text assets include one or more of text content of the game or chat content generated within the game.

In some implementations, the fourth input neural network generates the fourth portion of the feature vector based on one or more audio assets in the digital assets, wherein the audio assets include one or more of game sounds or game background music.

In some implementations, the fifth input neural network generates the fifth portion of the feature vector based on one more gameplay assets, and the gameplay assets includes one or more of code coverage or frequency of use of digital assets during gameplay.

Some implementations include a non-transitory computer-readable medium with instructions that, responsive to execution by a processing device, causes the processing device to perform operations that include providing, as input to a trained machine learning model, data that includes a plurality of game identifiers and a respective set of digital assets associated with each game identified by the game identifiers, generating, using the trained machine learning model, a plurality of predicted text tags, each text tag associated with a respective prediction score, and selecting the one or more text tags from the plurality of predicted text tags based on the respective prediction score.

Some implementations include a system comprising: memory with instructions stored thereon, and a processing device, coupled to the memory, the processing device configured to access the memory and execute the instructions, wherein the instructions cause the processing device to perform operations including providing, as input to a trained machine learning model, data that includes a plurality of game identifiers and a respective set of digital assets associated with each game identified by the game identifiers, generating, using the trained machine learning model, a plurality of predicted text tags, each text tag associated with a respective prediction score, and selecting the one or more text tags from the plurality of predicted text tags based on the respective prediction score.

DETAILED DESCRIPTION

Figure 1:
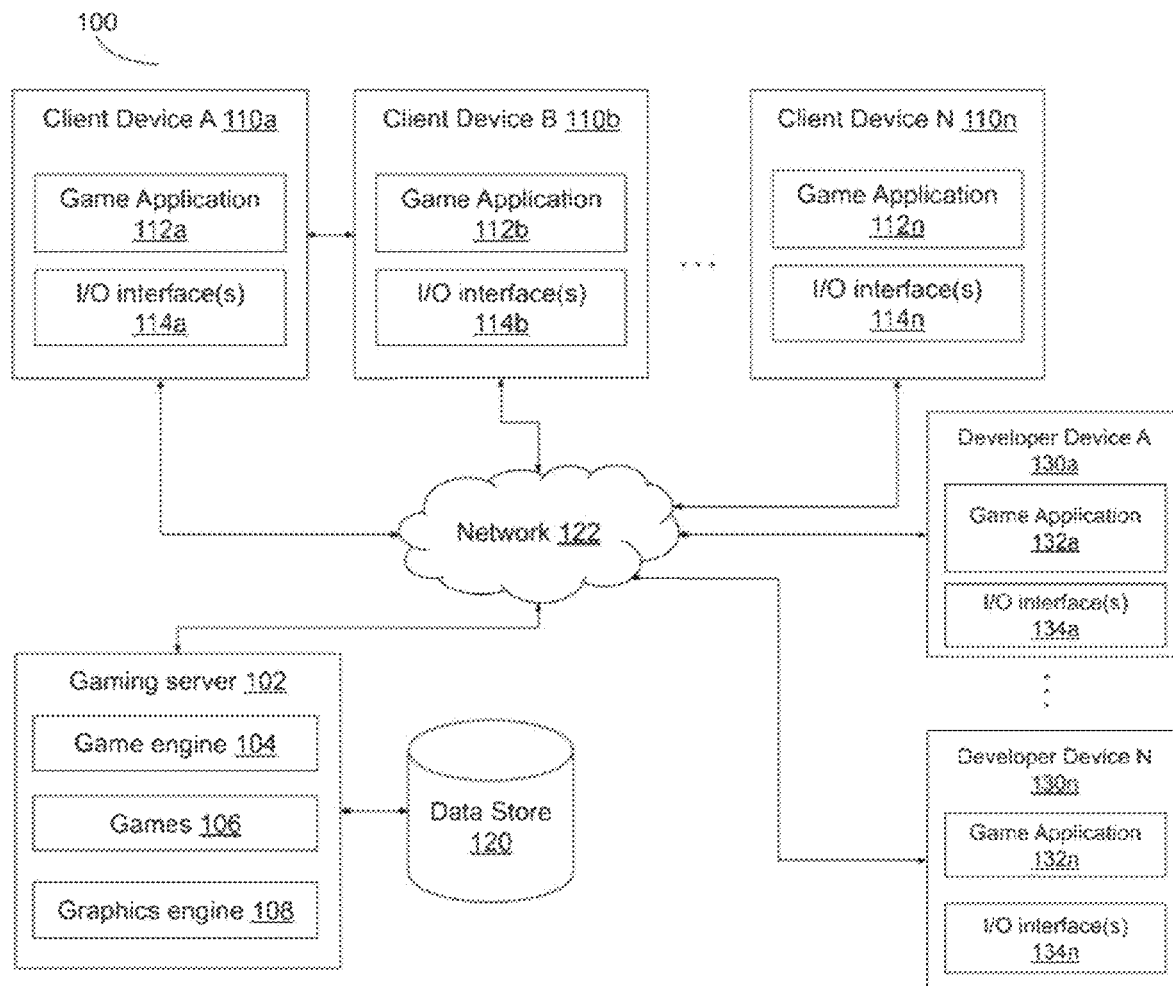
FIG. 1 is a diagram of an example system architecture to generate text tags for games, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the drawings, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online gaming platform may also allow users (developers) of the platform to create new games and/or characters. For example, users of the online gaming platform may be enabled to create, design, and/or customize new characters (avatars), new animation packages, and make them available to other users.

Games may be categorized based on their type and/or game play style. In some implementations, games can be organized by one or more of gameplay characteristics, objective (of the game) type, and subject type (for example, sports, challenge, action, or racing). The category may be labeled by one or more text tags associated with the game.

Other users (players) may discover games to play by browsing or based on a search. The search may be performed by name or by category, and the user may select a game they wish to play based on a list of games displayed. In some implementations, games likely of interest to the player are surfaced and displayed to the user, for example, at a time of login to the game platform or resumption of a session at the game platform by a player.

Game players and game platform owners benefit from associating suitable text tags to various games. Labeling of games by utilizing text tags can enable efficient discovery of games by users and thus provide a better user experience on the game platform. The text tags can be utilized for ranking of games on the game platform and/or as input to recommender models, e.g. machine learning models, utilized on the game platform. For example, the recommender models can generate game recommendations for users based on text tags associated with games. The game recommendation models may also utilize rankings in generating the game recommendations. A technical problem for game platform operators is the accurate labeling and discoverability of games across the game platform(s).

Some users may not provide tags for games that they make available via the game platform, or may provide tags that do not sufficiently aid discovery of the game by players that use the game platform. In some cases, users may intentionally incorrectly label a game with a view to get increased player traffic to their game. Tags that are manually assigned to a game (e.g. by a developer) can be evaluated by comparison with generated text tags for the game to determine manually assigned tags that are incorrect or irrelevant. Upon such evaluation, incorrect or irrelevant tags may be suppressed, e.g., hidden and/or removed from association with the game. Suppression of manually assigned tags in this manner can help ensure that player traffic to a game is genuine, based on the quality of the game and relevance of the game to a player's interests. This can lead to a higher proportion of game play sessions that players enjoy, and reduce the number of short (e.g., less than 1 minute) or unsatisfactory sessions that may occur due to incorrect or irrelevant labels. Some embodiments disclosed herein automatically determine text tags that may be associated with various games on the game platform. The text tags thus determined can be associated with the game.

FIG. 1 illustrates an example system architecture 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online gaming server 102, data store 120, client devices 110a, 110b, and 110n (generally referred to as "client device(s) 110" herein), and developer devices 130a and 130n (generally referred to as "developer device(s) 130" herein). Gaming server 102, data store 120, client devices 110, and developer devices 130 are coupled via network 122. In some implementations, client devices(s) 110 and developer device(s) 130 may refer to the same or same type of device.

Online gaming server 102 can include, among other things, a game engine 104, one or more games 106, and graphics engine 108. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a game application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, cloud based storage, or another type of component or device capable of storing data. The data store 120 may also include multiple storage components (e.g., multiple drives or multiple databases) that may also span multiple computing devices (e.g., multiple server computers).

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a web site (e.g., a webpage) or application back-end software that may be used to provide a user with access to content provided by online gaming server 102. For example, users may access online gaming server 102 using the game application 112 on client devices 110.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include one or more electronic file(s) that can be executed or loaded using software, firmware or hardware configured to present the game content (e.g., digital media item) to an entity. The electronic file(s) can include digital game digital assets such as animation routines, image files, audio files, and other content utilized in set up of the game environment. The game digital assets can be stored in data store 120 and/or in games 106.

The game digital assets can include game objects, game items, game characters, etc. that may each be stored in electronic representations, e.g., 2D/3D sketches, 2D/3D models of game objects, textures, images, videos, code, avatars, etc. The game digital assets can also include the electronic files utilized in a run-time environment to create a virtual game environment.

In some implementations, a game application 112 may be executed and a game 106 rendered in connection with a game engine 104. In some implementations, a game 106 may have a common set of rules or common goal, and the environment of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game application 112 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106.

For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112).

In some implementations, game content (also referred to as "content" herein) may refer to any data or software instructions (e.g., game digital assets, game objects, game, user information, video, images, commands, media item, etc.) associated with online gaming server 102 or game applications. In some implementations, game objects (e.g., also referred to as "item(s)" or "objects" or "virtual objects" or "virtual game item(s)" herein) may refer to objects that are used, created, shared or otherwise depicted in game applications 106 of the online gaming server 102 or game applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the online gaming server 102 hosting games 106, is provided for purposes of illustration, rather than limitation. In some implementations, online gaming server 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associated the specific user(s) with a game 106 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110/116, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction(s) for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online gaming server 102 may store characters created by users in the data store 120. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server

102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, each developer device 130 may include an instance of the game application 132, respectively. In one implementation, the game application 112 may permit a developer user(s) to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 132 may be an online gaming server application for users to build, create, edit, upload content to the online gaming server 102 as well as interact with online gaming server 102 (e.g., provide and/or play games 106 hosted by online gaming server 102). As such, the game application may be provided to the client device(s) 110 by the online gaming server 102. In another example, the game application 132 may be an application that is downloaded from a server. Game application 132 may be configured to interact with online gaming server 102 and obtain access to user credentials, user currency, etc. for one or more games 106 developed, hosted, or provided by a game developer.

In some implementations, a user may login to online gaming server 102 via the game application. The user may access a user account by providing user account information (e.g., username and password) where the user account is associated with one or more characters available to participate in one or more games 106 of online gaming server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites.

In some implementations, online gaming server 102 may include a graphics engine 108. In some implementations, the graphics engine 108 may be a system, application, or module that permits the online gaming server 102 to provide graphics and animation capability.

Figure 2A:
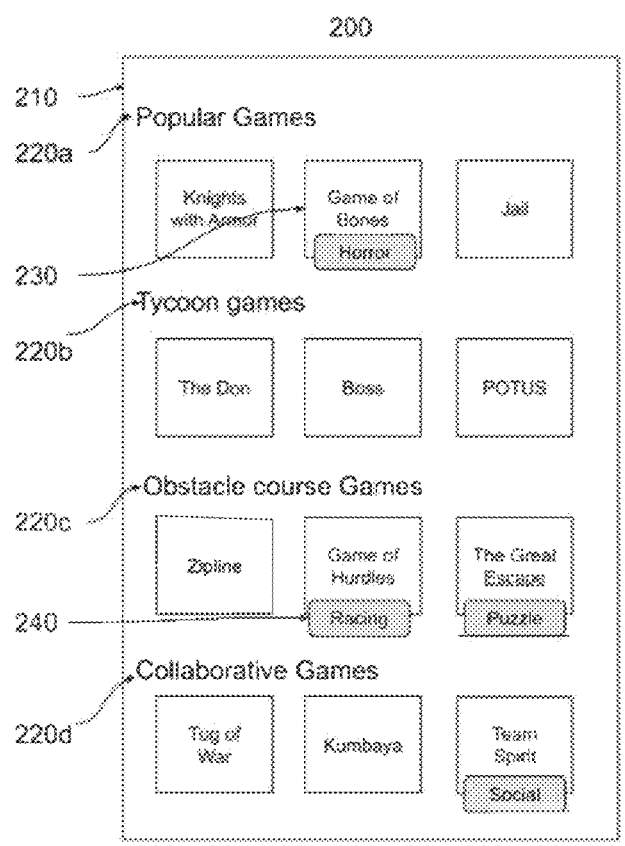
FIG. 2A illustrates an example listing of games arranged by categories, in accordance with some implementations.

FIG. 2A illustrates an example listing of games arranged by categories, in accordance with some implementations. The listing is displayed via a user interface that includes different games available on a game platform to a user.

Game lists may be generated (for example, by online gaming server 102) from available games on a game platform to enable game selection by users. Statistics of gameplay, number of users playing different games, engagement level of users, game types, etc. may be utilized to determine game popularity.

In some implementations, categories (220a-220d) of games may be promoted (highlighted) to users. Example categories may include popular games (220a), top social games (220b), top adventure games (220c), and games recommended for a user (220d), etc. Each category may include a list of individual games (for example, 230). Individual games may also be annotated with tags (240) that may be displayed along with an icon or other display associated with a game. In some implementations, the game lists may be provided on an initial display of a user device via a user interface.

Games may also be associated with tags indicative of features associated with and included in the games. For example, games may be associated with tags such as tycoon game, obstacle course game, first person shooter game, collaborative game, social game, etc. that can enable a user to obtain additional information about the type of game. Multiple tags may be associated with games that are associated with a first category and games with a second tag can be associated with multiple categories. For example, a category of games titled "Racing Games" may include games with example tags "city race," "jungle race," "desert race," "camel race," etc.

In some implementations, games may be categorized into various game categories based on their genre or tags associated with the game (adventure game, social game, etc.). Multiple text tags or categories may be assigned to a game. In some implementations, the nature of gameplay interaction may be utilized to categorize the games. In some implementations, example categories for a game may include action, adventure, fighting, platform, puzzle, racing, role-playing, shooter, simulation, sports strategy, etc. In some implementations, example categories for a game may include a location setting, a genre, and/or a theme for the game, e.g. town and country, western, space, etc.

Highlighting games may enable users to easily browse available games, discover game(s) of interest to them, and make a selection of their preferred game from all available games on the platform.

In some implementations, example categories for a game may include the type(s) of device that is well-suited to play the game. For example, a game may be labeled as suitable for desktop, mobile, virtual reality (VR), etc.

Figure 2B:
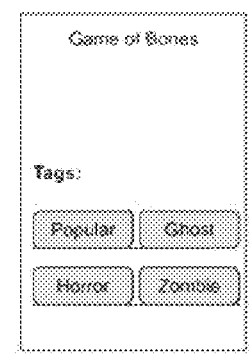
FIG. 2B illustrates an example tag-wise listing, in accordance with some implementations.

FIG. 2B illustrates an example tag-wise listing, in accordance with some implementations. In this illustrative example, the user interface (UI) displays a game or game icon along with all its associated tags. With this UI view, a participant may browse game details and obtain information about all the tags associated with the game.

Figure 2C:
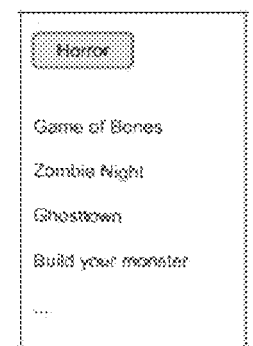
FIG. 2C illustrates another example of a tag-wise listing, in accordance with some implementations.

FIG. 2C illustrates another example of a tag-wise listing, in accordance with some implementations. In this illustrative example, the user interface displays a list of all or multiple games (or game icons) that are associated with a given tag. This UI view can enable a participant to browse for games that are associated a tag of interest to the participant.

In some implementations, the text tags are associated with the game and displayed in a user interface. In some implementations, the text tags are utilized to group together games with similar text tags. In some implementations, the text tags are associated with a game, and searchable by a user when the user is searching for a certain type of game.

Figure 3:
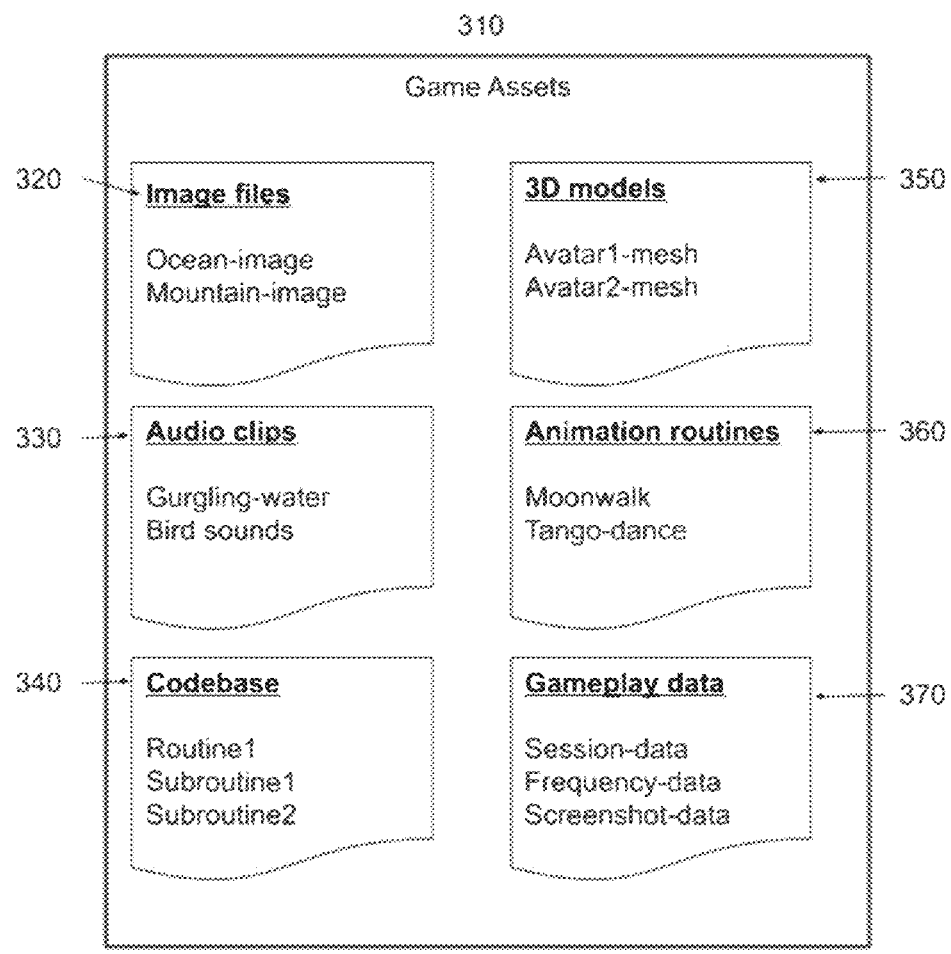
FIG. 3 is a diagram illustrating example data structures associated with game digital assets, in accordance with some implementations.

FIG. 3 is a diagram illustrating example data structures associated with game (digital) assets, in accordance with some implementations.

In some implementations, the digital assets include various assets associated with a game. The digital assets may include user generated digital content, user uploaded digital content, and/or digital content selected by the user from digital assets available on the game platform(s).

Example types of digital assets include image files (320), audio clips (330), codebase assets (340), 3D models and/or meshes (350), animation routines (360), or gameplay data (370). Other types of digital assets are possible based on a type of game.

Image files (320) may include images utilized in the game, for example, background images, wallpaper images, maps, images that are displayed within the game, etc. Image files may also include thumbnail image(s) and videos associated with the game, e.g. images and videos provided by a game developer. Image files utilized in a game may be indicative of the game content. For example, if a game has a number of car images, it may be indicative that the gameplay relates to cars. If a game has a number of roadway images that are loops, it may be indicative that the gameplay relates to racetracks or racing, while if another game has roadway images that are open stretches of road, it may be indicative that the game is a travel or tour-related game. In another example, if a game has a lot of automotive part images but few complete vehicles, it may be indicative that the game relates to building vehicles out of parts.

Audio clips (330) include user (developer) generated audio clips and/or audio clips selected from a list of options available on the game platforms. Example audio clips include the sound of racing cars, sounds of the forest, footsteps, character sounds, sounds associated with game objects, etc. Audio files utilized in a game may be indicative of the game content. For example, if the game digital assets include a number of audio clips with the noise of racing cars, it may be indicative that the game relates to car racing. If the game has a number of audio files that are sounds of clashing swords, it may be indicative that the game relates to a fighting game. In another example, if the game has audio files of cheering spectators, it may be indicative that the game relates to sports.

Codebase assets (340) include the code base utilized for the game may include initialization routines, pre-compiled code, functional code, etc. The text and comment(s) in the codebase may also be included. In some implementations, a history of codebase changes may also be included. In some implementations, codebase data may include data that includes a record of the time spent by a developer on various features and/or digital assets within the codebase. For example, if comments in the codebase of a game refers to names of racing cars, it may be indicative that the game relates to car racing. In another example, if the codebase includes subroutines that are associated with dancing moves, it may be indicative that the game relates to dancing.

3D model data (350) can include the 3D model data, including meshes associated with the game. For example, the 3D model data may include mesh data of one or more avatars and/or other objects utilized in the game. In an example, if the 3D model data has mesh data of avatars that is associated with humans riding on horses, it may be indicative that the game relates to knights. In another example, if the 3D model data has mesh data associated with rollercoasters and/or other rides, it may be indicative that the game relates to theme parks.

Animation routines (360) can include data associated with animations and movements of avatars and/or objects within the game. The animation routines can include platform-provided animation routines (catalog animations) as well as custom animations provided by a game developer. For example, dancing moves, avatar gestures, action sequences, etc. may be included. In an example, if the animation routines associated with a game use a simulator associated with motion capture dancing (Mocap dancing), it may be indicative that the game is a dancing game. In another example, if the animation includes a running animation, it may be indicative that the game is a running game, or is a game that includes running as an activity, e.g., a field sports game.

Game play data (370) may include details of game sessions played by one or more players on the game platform(s). In some implementations, the game play data includes details of use of various game digital assets. For example, the game play data may include data of whether game digital assets were actually invoked during the game sessions, a frequency of use of one or more game digital assets, a total duration of game play by one or more players, and a total duration of use of the game digital assets and/or features associated with the game digital assets. In an example, if a running animation is a game digital asset that has substantial use in the game, it may be indicative that the game is a running game. In another example, the game digital asset may include images of cars as well images of pizzas, wherein the images of cars may not be utilized in the code base while the images of pizzas are utilized in the code base, indicating that the game relates to a pizza game and may not be related to a car racing game.

In some implementations, game play data may include chat data of players during one or more gameplay sessions.

Digital assets from multiple categories described above are utilized in an analysis of the game. For example, if the digital assets of a game includes image files of cars, racetracks, confetti, champagne, racings flags, and codebase assets that include physics code associated with collisions, and animation code associated with moving vehicles, it may be indicative that the game is a racing game. In an example, a game that includes image files of car parts, airplane parts, spaceship parts, connectors, etc. but no animation/physics code, it may be indicative that the game relates to a mechanical building game. In another example, a game that has digital assets that include image files of food ingredients and 3D model data of buildings, it may be indicative that the game relates to restaurant operation.

Figure 4:
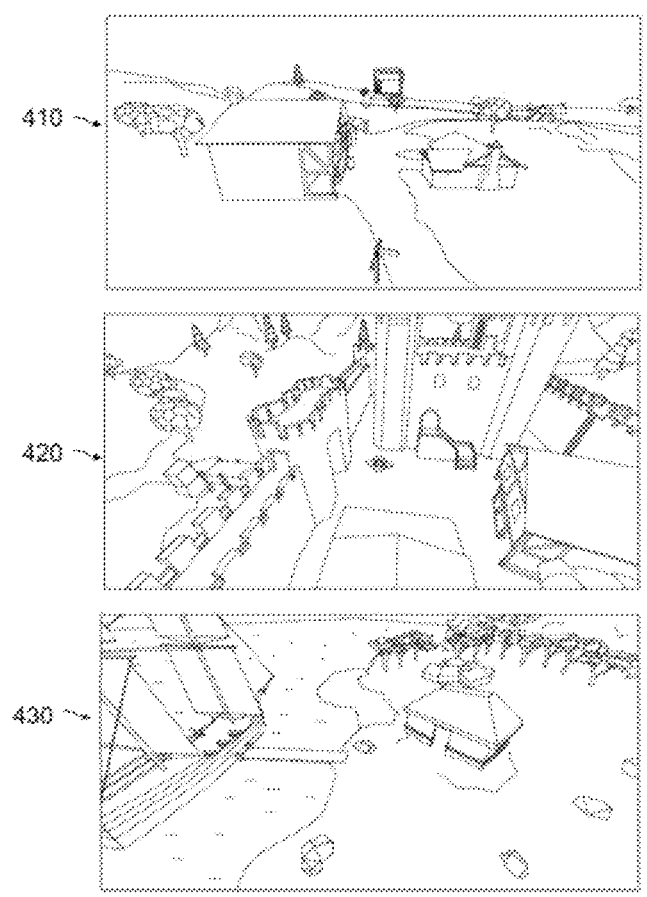
FIG. 4 is a diagram illustrating example screenshots from a gameplay session, in accordance with some implementations.

FIG. 4 is a diagram illustrating example images from a gameplay session, in accordance with some implementations.

In some implementations, in addition to the digital assets described with respect to FIG. 4, screenshots of gameplay sessions may also be recorded. The screenshots may be obtained from previous game play sessions by different user(s) or groups of players. In some implementations, screenshots may also be obtained from a rendering of gameplay sessions in a simulated manner.

For example, screenshot 410 depicts a scene that includes a house, trees, gently rolling hills; screenshot 420 depicts a scene that includes a castle; and screenshot 430 depicts a scene that includes a ship, water's edge, a house, and a forest.

In some implementations, image analysis may be performed on the screenshots to determine/identify physical features, terrain, objects, etc. that may be depicted in the screenshots. The determined physical features, terrain, objects, etc. may be utilized to determine game characteristics that may be utilized for the generation of text tags for the game.

In some implementations, selected screenshots of the game sessions are stored as a game digital asset. In some implementations, the screenshots are processed, and labels generated based on the screenshots are stored.

Figure 5:
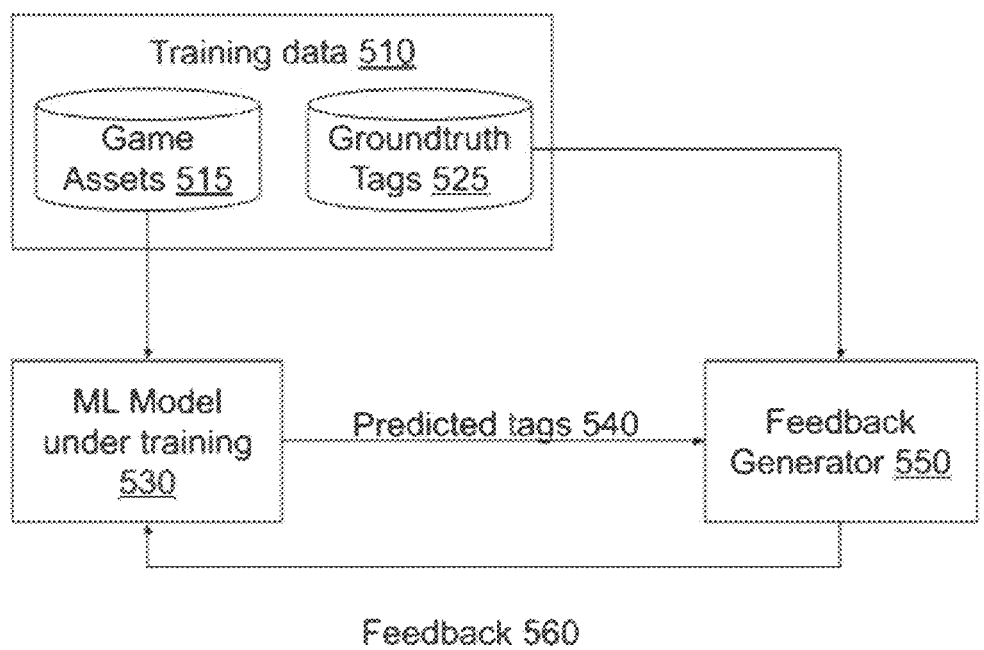
FIG. 5 is a block diagram illustrating an example of supervised machine learning (ML) to generate text tags, in accordance with some implementations.

FIG. 5 is a block diagram illustrating an example of supervised machine learning (ML) to generate text tags, in accordance with some implementations.

The supervised learning can be implemented on a computer that includes one or more processors and memory with software instructions. In some implementations, the one or more processors may include one or more of a general purpose central processing unit (CPU), a graphics processing unit (GPU), a machine-learning processor, an application-specific integrated circuit (ASIC), a field-programmable gate array (FPGA), or any other type of processor.

In this illustrative example, supervised learning is used to train a machine learning (ML) model 530 based on training data 510 and a feedback generator 550. ML model 530 may be implemented using any suitable machine learning technique, e.g., a feedforward neural network, a convolutional neural network, or any other suitable type of neural network. In some implementations, other machine learning techniques such as Bayesian models, support vector machines, hidden Markov models (HMMs), etc. can also be used to implement ML model 530.

The training data 510 includes game (digital) assets 515 and groundtruth tags 525 for a plurality of games. The digital assets may include any digital assets, e.g., described with respect to FIG. 3. The groundtruth text tags may be obtained from tags provided by the developers of the games, game players, or other human users.

In this illustrative example, digital assets 515 are provided to a machine learning (ML) model under training 530. The ML model generates a set of predicted tags 540 based on a current state of the ML model and the digital assets. For example, the ML model may determine a feature vector (or embedding) based on features of digital assets 515. The feature vector (or embedding) may be a mathematical, multi-dimensional representation generated based on the digital assets 515. Different games may have different feature vectors, based on respective digital assets. Upon training, the ML model generates similar feature vectors for similar games (games that are associated with similar types of digital assets).

Analysis based on individual components of the digital game digital assets can lead to inaccurate determination of game content. Instead, analysis of the game digital assets considered as a whole can lead to likely accurate determination of game content. Similar gameplay from multiple games would include similar assets in a feature space that is revealed by analyzing the game features using the ML model. Each game digital asset and/or combinations of the game digital assets could be used as a feature that is input to an ML model. The features are utilized by the ML model to cluster games and generate predicted tags associated with the games.

Stated another way, the digital assets may be used to determine features of the game using ML model 530. ML model 530 may utilize the feature vectors to generate the text tags for the game. For example, a first game may have digital assets including maps, rooms, walls, trees, etc. along with human characters and clothing/accessories for the characters, while a second game may have digital assets including cars, racetracks, fuel, etc., animation code that renders the cars moving, and game images/screenshots that depict multiple cars along a racetrack. ML model 530 may generate feature vectors that are significantly apart for these two example games based on the games not having digital assets that have similarity. On the other hand, for a third game that includes digital assets such as trucks, road, confetti, etc., and videos of trucks moving down a road, the generated feature vector may be similar to that of the second game.

ML model 530 may generate game text tags based on the digital assets associated with the game, e.g., based on the feature vector, and/or based on similarity with feature vectors of other games and tags associated with those other games. For example, ML model 530 may generate a "racing" tag for the second and the third game, and an "adventure" tag for the first game.

Codebase assets that include physics of navigation and movement of an avatar provide additional signals that the game may be a navigable game. Similarly, codebase assets, for example, camera placement within the game, may provide signals about a game perspective—for example, whether the game is a first person based game.

The predicted tags 540 generated by ML model 530 are provided to feedback generator 550.

Feedback generator 550 is also provided with the groundtruth tags 525 (e.g., human-curated tags) corresponding to the game. Feedback 560 is generated by feedback generator 550 based on a comparison of the predicted tags with the groundtruth tags. For example, if predicted tags 540 are similar to groundtruth tags 525, positive feedback may be provided as feedback 560, while if the tags are dissimilar negative feedback is provided to the ML model under training, which may be updated based on the received feedback using reinforcement learning techniques.

In some implementations, the ML model includes one or more neural networks. The neural network(s) may be organized into a plurality of layers including a plurality of layers. Each layer may comprise a plurality of neural network nodes. Nodes in a particular layer may be connected to nodes in an immediately previous layer and nodes in an immediately next layer. In some implementations, the ML model may be a convolutional neural network (CNN).

In some implementations, the digital assets are all processed simultaneously by a single ML model. In some implementations, a particular type of digital assets are processed by a first ML model, while other types of digital assets may be processed by respective ML models for the types of assets. For example, the image files may be processed by a first ML model, the audio clips by a second ML model, etc. In these implementations, the structure of ML model 530 may include a plurality of ML models that analyze different types of digital assets and produce respective feature vectors, and an ML model that takes as input the individual feature vectors, combines them, and generates predicted tags 540.

In some implementations, different types of ML models may be utilized to process different categories of digital assets and identify characteristic features in each category of digital asset. For example, processing of image digital assets may utilize a convolutional neural network (CNN), processing of audio digital assets may utilize a deep neural network (DNN) architecture, processing of text digital assets may utilize a Bidirectional Encoder Representations from Transformers (BERT) model, etc. The identified features may then be processed by a different ML model that operates on these intermediate outputs as its inputs to generate the predicted tags.

The training of the ML model may be performed periodically at specified intervals, or may be triggered by events. In some implementations, the training may be repeated until a threshold level of text tag prediction accuracy is reached.

Figure 6:
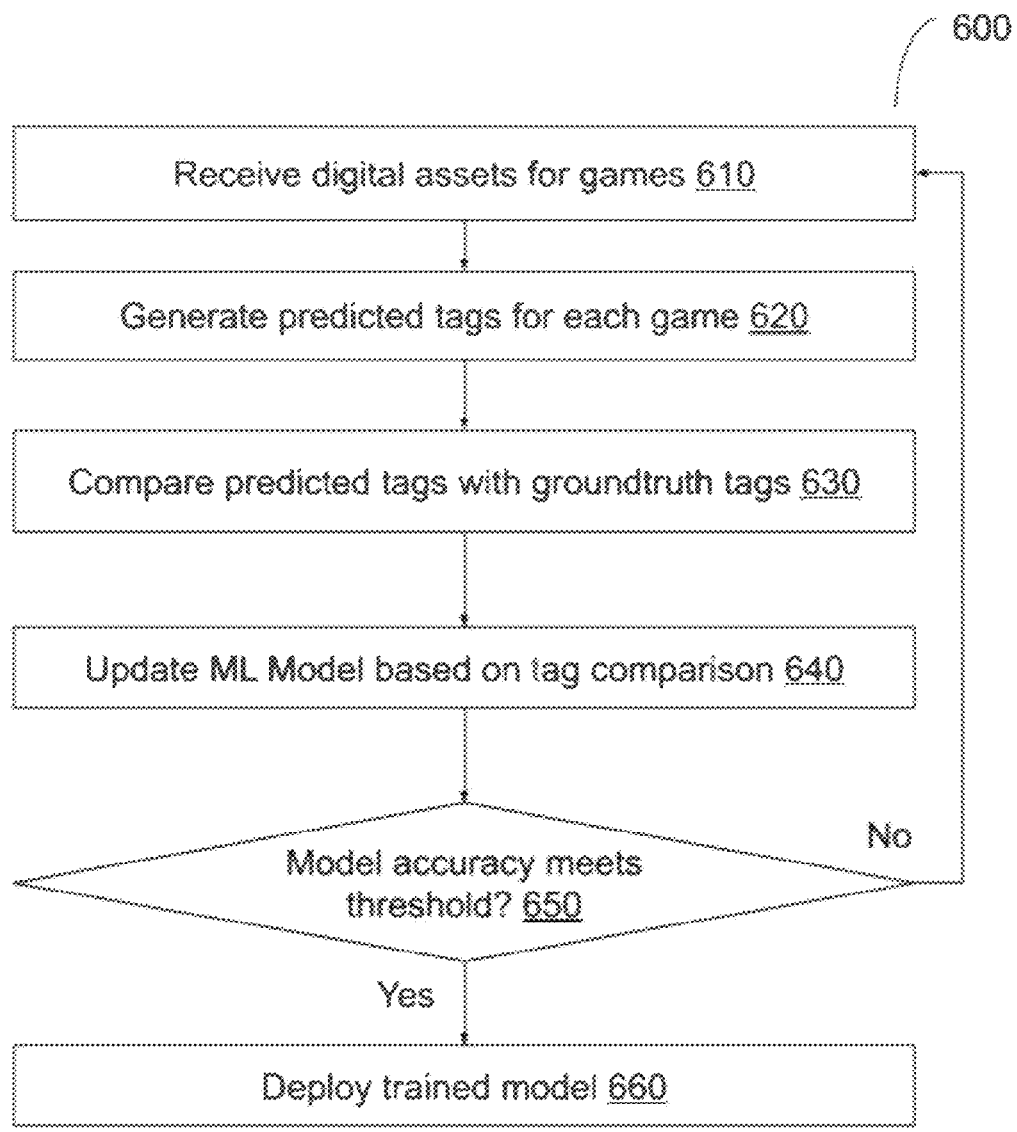
FIG. 6 is a flowchart illustrating an example method to train a machine learning model to generate text tags, in accordance with some implementations.

FIG. 6 is a flowchart illustrating an example method to train a machine learning model to generate text tags, in accordance with some implementations.

In some implementations, method 600 can be implemented, for example, on gaming server 102 described with reference to FIG. 1. In some implementations, some or all of the method 600 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a database 120 or other storage). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

In some implementations, the method 600, or portions of the method, can be initiated automatically by a system. In some implementations, the implementing system is a first device. For example, the method (or portions thereof) can be periodically performed, or performed based on one or more particular events or conditions, e.g., an accuracy of text tag prediction falling below a threshold, a predetermined time period having expired since the last performance of method 600, and/or one or more other conditions occurring which can be specified in settings read by the method.

Method 600 may begin at block 610. At block 610, digital assets associated with various games are provided as input to the machine learning model. The data includes a plurality of game identifiers, and a respective set of digital assets associated with each game identified by the game identifiers. For example, a title or alphanumeric code associated with a game, and a set of digital game digital assets, e.g. image files, 3D models, etc. may be provided as input to the ML model.

As described earlier, the digital assets may include one or more of game screenshots, game video snippets, game objects, meshes, avatars, game source code, game configuration parameters, game lighting, game level count, avatar movements, text content of the game, chat content generated within the game, game sounds, game background music, code coverage, or frequency of use of digital assets during gameplay. Block 610 may be followed by block 620.

At block 620, predicted text tags are generated by the ML model based on the digital assets for the game identified by the game identifiers and a current state of the ML model.

In implementations using a neural network, a respective feature vector may be generated for each game identified by the game identifiers based on the respective set of digital assets. The feature vector (or embedding) may be a mathematical, multi-dimensional representation generated based on the game digital assets. Different games may have different feature vectors, based on respective digital assets. Upon training, the ML model generates similar feature vectors for similar games (games that are associated with similar types of game digital assets).

In some implementations, the machine learning model includes one or more input neural networks and an output neural network. The respective feature vector(s) are generated using the one or more input neural networks and the respective feature vector(s) may be provided as inputs to the output neural network.

In some implementations, a first neural network generates a first portion of the feature vector based on one or more image assets in the digital assets, a second neural network generates a second portion of the feature vector based on one or more code assets in the digital assets, a third neural network generates a third portion of the feature vector based on one or more text assets in the digital assets, a fourth neural network generates a fourth portion of the feature vector based on one or more audio assets in the digital assets, and a fifth neural network that a fifth portion of the feature vector based on one more gameplay assets.

In some implementations, the one or more image assets may include one or more of game screenshots, game video snippets, game objects, meshes, or avatars. In some implementations, the code assets may include one or more of game source code, game configuration parameters, game lighting, game level count, or avatar movements.

In some implementations, the text assets may include one or more of text content of the game or chat content generated within the game. In some implementations, the audio assets may include one or more of game sounds or game background music. In some implementations, the gameplay assets may include one or more of code coverage or frequency of use of digital assets during gameplay. Block 620 may be followed by block 630.

At block 630, the predicted text tags are compared to groundtruth tags. For example, one or more predicted text tags for the game identified by the game identifier are compared to respective groundtruth tags associated with the game. The groundtruth text tags may be obtained from tags provided by the developers of the games, game players, or other human users. An accuracy of text tag prediction is determined for each game, e.g. it is evaluated whether the ML model successfully predicted text tags for each game based on the provided digital assets. A loss value is determined based on the accuracy of text tag predictions. For example, a cross entropy loss function on a multi-class classifier can be utilized for the text tag predictions. Block 630 may be followed by block 640.

At block 640, the ML model is updated based on feedback generated from the comparison of the predicted tags and the groundtruth tags. For example, the loss value is utilized to adjust one or more parameters of the ML model. For example, when the ML model is implemented using a neural network, the weight associated with one or more nodes of the neural network and/or a connection between one or more pairs of nodes of the neural network may be adjusted based on the loss value. In some implementations, a weight associated with a link between a pair of nodes of the neural network may be adjusted. Block 640 may be followed by block 650.

At block 650, an accuracy of the ML model is determined based on cumulative results, and compared to a threshold. For example, the tags generated by the ML model may be compared against groundtruth tags to determine the accuracy. In another example, the tags generated by the ML model may be used to display a user interface to game platform users and the effectiveness of the tags be measured (e.g., based on clickthrough rate for the tags, gameplay generated by the user interface that includes the tags generated the ML model vs. tags obtained in other ways in a A/B testing configuration, human evaluation of the tags, etc.) If the accuracy meets a threshold, the trained ML model is determined to be suitable for deployment and processing proceeds to block 660, else, the ML model training is continued and processing reverts to 610.

At block 660, the trained ML model may be deployed for the generation of text tags for games.

Method 600, or portions thereof, may be repeated any number of times using additional inputs. For example, blocks 620 and 630 may be repeated with multiple sets of groundtruth text tags. In another example, block 610-650 may be repeated with additional games. Method 600 may be repeated until a threshold level of text tag prediction accuracy is reached.

In some implementations, method 600, or portions thereof, may be repeated based on a change in game ratings, e.g. change in ratings of top/popular games on the game platform, or based on the results of an A/B test. In some implementations, model parameters may be adjusted, and the model retrained based on a triggering factor, e.g. change in game ratings, results of an A/B test, etc.

Figure 7:
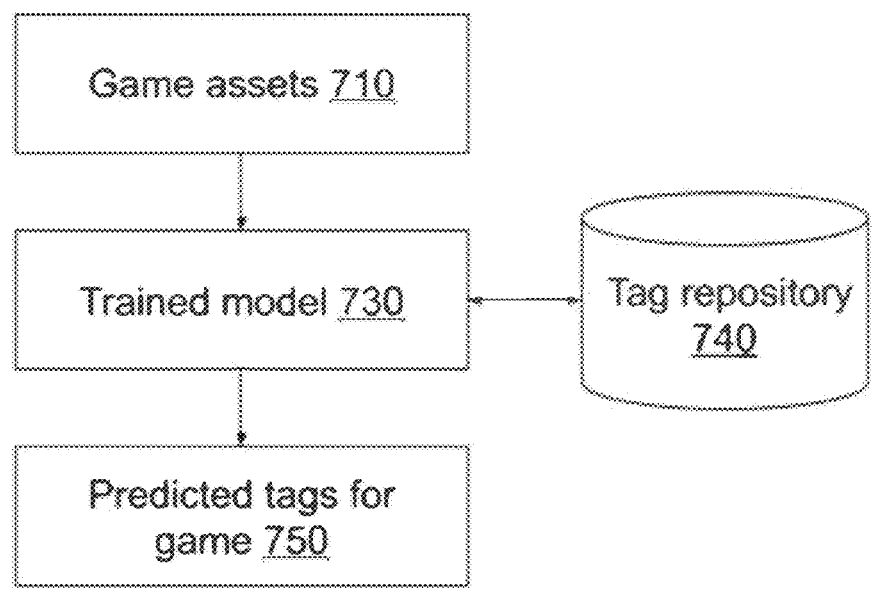
FIG. 7 is a block diagram illustrating an example method to generate text tags for games using a machine learning model, in accordance with some implementations.

FIG. 7 is a block diagram illustrating an example method to generate text tags for games using a machine learning model, in accordance with some implementations In some implementations, the trained machine learning model 730 is utilized for the generation of text tags 750 based on game (digital) assets 710. A tag repository 740 may be utilized to store a plurality of text tags. Predicted text tags 750 are generated based on the digital assets 710.

As described earlier with respect to FIG. 5, game digital assets and game digital asset combinations are provided as features to the ML model, which uses the features to cluster games and to determine text tags associated with the games.

In some implementations, the ML model is a neural network, e.g. similar to the neural network model described with respect to FIG. 6.

In some implementations, the ML model may include one or more of binary classification, multiclass classification, and regression. In some implementations, the ML model may be a K-means model, kNN model, Linear Regression model, Logistic Regression model, Decision Tree model, SVM model, Naive Bayesian model, Random Forest model, etc.

In some implementations, different ML models may be utilized for different classes of digital assets. In some implementations, the same ML model may be utilized across all digital assets.

In some implementations, the predicted text tags may be determined based on agreement of predicted tags based on different types (classes) of digital assets. For example, a text tag may be predicted when predictions from two or more types of digital assets are the same. In some implementations, a text tag may be predicted when predictions from three or more types of digital assets are the same.

In some implementations, weights may be assigned to predictions based on different digital assets, and a weighted score may be utilized to determine a predicted tag by the ML model.

In some implementations, text tags provided by users (developers) may be validated by the ML model to ensure that malicious developers do not provide misleading text tags that are not supported by game features. For example, if a certain type/category of game is very popular, a game developer may attach a tag to their game that indicates that the game belongs to the popular game category, when in reality, it may not include features corresponding to the popular game category.

Figure 8:
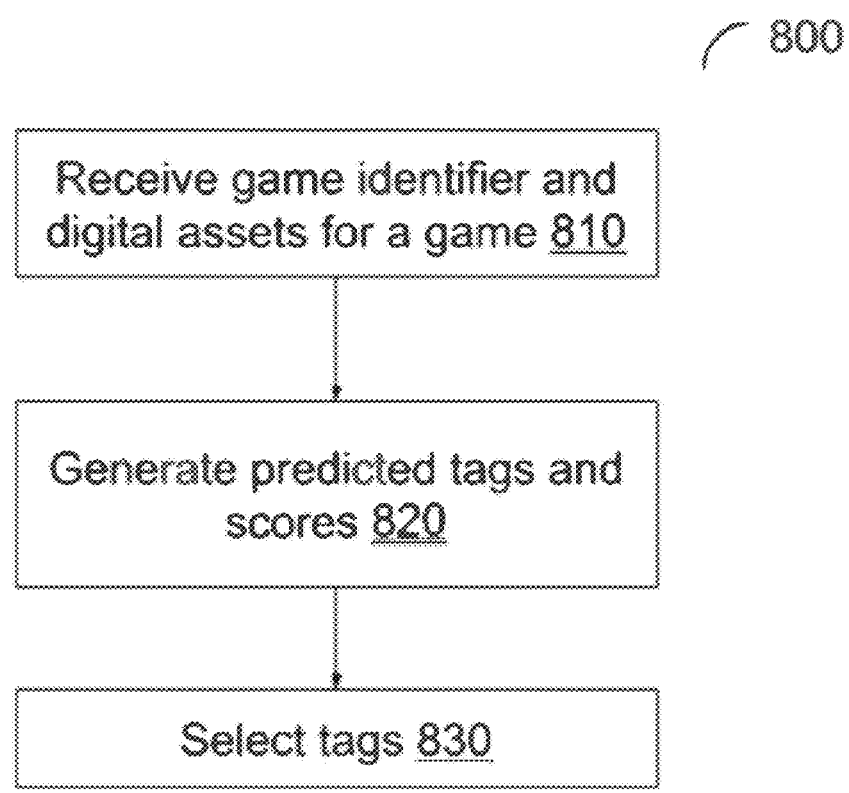
FIG. 8 is a flowchart illustrating another example method to generate text tags for games using a machine learning model, in accordance with some implementations.

FIG. 8 is a flowchart illustrating another example method to generate text tags for games using a machine learning model, in accordance with some implementations.

For example, the trained ML model may be ML model 530, obtained after training using the techniques described above with reference to FIG. 5.

In some implementations, method 800 can be implemented, for example, on gaming server 102 described with reference to FIG. 1. In some implementations, some or all of the method 800 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a database 120 or other storage). In some implementations, different components of one or more servers and/or clients can perform different blocks or other parts of the method 800. In some examples, a first device is described as performing blocks of method 800. Some implementations can have one or more blocks of method 800 performed by one or more other devices (e.g., other client devices or server devices) that can send results or data to the first device.

At block 810, a game identifier for a game in addition to digital assets associated with the game are received. The game identifier and the digital assets are provided as input to the trained machine learning model.

In some implementations, the digital assets may include one or more of game screenshots, game video snippets, game objects, meshes, avatars, game source code, game configuration parameters, game lighting, game level count, avatar movements, text content of the game, chat content generated within the game, game sounds, game background music, code coverage, or frequency of use of digital assets during gameplay. Block 810 may be followed by block 820.

At block 820, predicted text tags and scores associated with each of the predicted tags are generated. The predicted tags may be generated, for example, by a trained ML model, as described in FIG. 6. A plurality of predicted text tags may be generated using the trained machine learning model. Each text tag may also be associated with a respective prediction score, which is indicative of a prediction confidence computed using the machine learning model for the text tag.

In some implementations, the predicted text tags may be restricted to a collection of words or vocabulary that is specific to the game platform. For example, words and/or phrases from text tags that are manually provided by users, e.g., game creators, game players, etc. and are associated with games on the game platform may form the vocabulary. In some implementations, the predicted text tags may be unrestricted, e.g., may include any word from a larger corpus of words such as a language dictionary.

In some implementations, the one or more text tags are indicative of a type of the game or a style of game play. For example, the text tags may include tags such as tycoon game, obstacle course game, first person shooter game, collaborative game, social game.

In some implementations, thresholds may be utilized to surface a set of predicted tags. Block 820 may be followed by block 830.

At block 830, one or more tags may be selected based on the thresholds. One or more text tags may be selected from the plurality of predicted text tags based on the respective prediction score.

In different implementations, the selected tags may be utilized for various purposes. In some implementations, one or more of the selected tags can be stored in a database in association with the game identifier. In these implementations, the stored tags can be utilized to support game search or browsing. For example, a semantic comparison of a user-entered search term (e.g., "horse riding") with the stored tags may be performed to identify games that match the user search. In another example, the stored tags may be used to render a user interface that enables a user to browse games by tags assigned to the game.

In some implementations, the selected tags for a game may be utilized to evaluate tags that are manually assigned to a game (e.g., by a game creator). The evaluation may include determination of whether each manually assigned tag are incorrect or irrelevant. Upon such evaluation, incorrect or irrelevant tags may be suppressed, e.g., hidden and/or removed from association with the game. Suppression of manually assigned tags in this manner can help ensure that player traffic to a game is genuine, based on the quality of the game and relevance of the game to a player's interests. This can lead to a higher proportion of game play sessions that players enjoy, and reduce the number of short (e.g., less than 1 minute) or unsatisfactory sessions that may occur due to incorrect or irrelevant labels.

Figure 9:
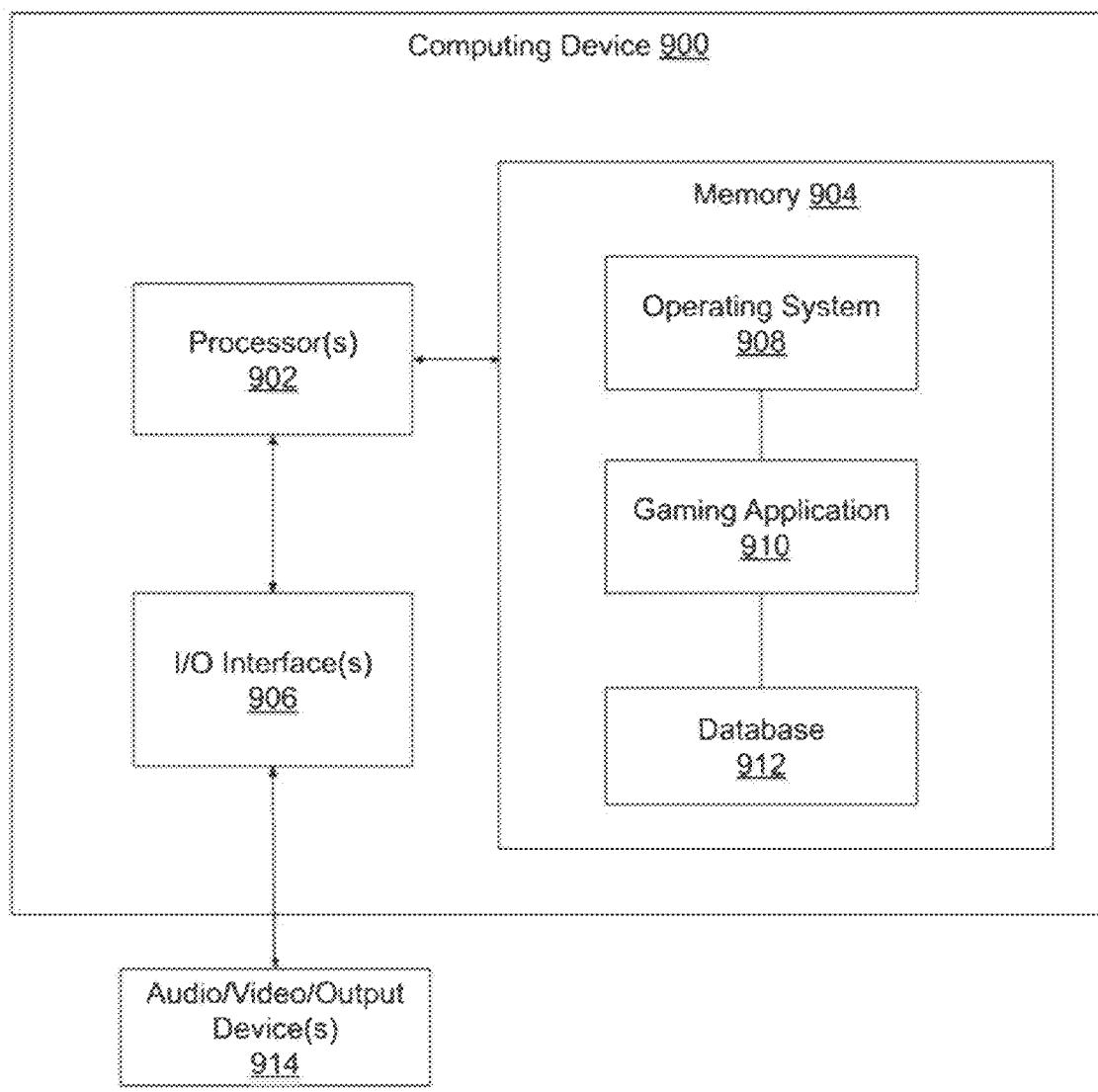
FIG. 9 is a block diagram illustrating an example computing device, in accordance with some implementations.

FIG. 9 is a block diagram of an example computing device 900 which may be used to implement one or more features described herein. In one example, device 900 may be used to implement a computer device (e.g. 102 and/or 110 of FIG. 1), and perform appropriate method implementations described herein. Computing device 900 can be any suitable computer system, server, or other electronic or hardware device. For example, the computing device 900 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 900 includes a processor 902, a memory 904, input/output (I/O) interface 906, and audio/video input/output devices 914.

Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, one or more applications 910, e.g., an audio spatialization application and application data 912. In some implementations, application 910 can include instructions that enable processor 902 to perform the functions (or control the functions of) described herein, e.g., some or all of the methods described with respect to FIGS. 6 and 8.

For example, applications 910 can include an audio spatialization module 912, which as described herein can provide audio spatialization within an online gaming server (e.g., 102). Any of software in memory 904 can alternatively be stored on any other suitable storage location or computer-readable medium. In addition, memory 904 (and/or other connected storage device(s)) can store instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or data store 120), and input/output devices can communicate via interface 906. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 914 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 9 shows one block for each of processor 902, memory 904, I/O interface 906, and software blocks 908 and 910. These blocks may represent one or more processors or processing circuitries, operating systems, memories, I/O interfaces, applications, and/or software engines. In other implementations, device 900 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 900, e.g., processor(s) 902, memory 904, and I/O interface 906. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 914, for example, can be connected to (or included in) the device 900 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 600 and 800) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to validate one or more text tags for a game, the method comprising:
    providing, as input to a plurality of machine learning models, data that includes a game identifier of the game and a set of digital assets of different classes associated with the game;
    generating, based on the set of digital assets and by respective models of the plurality of machine learning models, a respective feature vector of a plurality of feature vectors;
    generating, based on the plurality of feature vectors, a plurality of predicted text tags for the game, each predicted text tag associated with a respective prediction score;
    selecting one or more text tags from the plurality of predicted text tags based on the respective prediction score;
    obtaining a developer provided text tag for the game;
    validating the developer provided text tag for the game by comparing the developer provided text tag with the one or more selected text tags;
    determining that the developer provided text tag is irrelevant based on the comparison; and
    removing the developer provided text tag from association with the game.

2. The computer-implemented method of claim 1, wherein generating the plurality of predicted text tags comprises selecting from a collection of words associated with a game platform that hosts the game, wherein the selecting is based on the plurality of prediction scores.

3. The computer-implemented method of claim 1, wherein generating the plurality of predicted text tags comprises generating predicted text tags based on words included in a language dictionary.

4. The computer-implemented method of claim 1, wherein at least one of the plurality of machine learning models includes a convolutional neural network (CNN) and wherein the feature vector generated by the at least one of the plurality of machine learning models is based on a set of image assets from the set of digital assets.

5. The computer-implemented method of claim 1, further comprising displaying a user interface that includes a list of games associated with at least one of the one or more selected text tags.

6. The computer-implemented method of claim 1, further comprising displaying a user interface that includes the one or more selected text tags along with a game icon associated with the game.

7. The computer-implemented method of claim 1, wherein the digital assets comprise one or more of game objects, meshes, avatars, game source code, game configuration parameters, game lighting, avatar movements, text content of the game, game sounds, game background music, code coverage, or frequency of use of digital assets during gameplay.

8. The computer-implemented method of claim 1, further comprising training the plurality of machine learning models, wherein the training comprises, for each model:
providing, as input to the model, training data that includes a plurality of game identifiers and a respective set of digital assets of different classes associated with each game identified by the game identifiers;
generating, based on the set of digital assets and by the model, a respective feature vector;
generating, based on the feature vector, a plurality of predicted text tags;
comparing the plurality of predicted tags with respective tags associated with each game identified by the game identifiers; and
adjusting one or more parameters of the model based on the comparison of the plurality of predicted tags with respective tags associated with each game identified by the game identifiers.

9. The computer-implemented method of claim 1, wherein each machine learning model utilizes a respective subset of the set of digital assets that includes assets of a particular class.

10. A non-transitory computer-readable medium comprising instructions that, responsive to execution by a processing device, causes the processing device to perform operations to validate one or more text tags for a game comprising:
providing, as input to a plurality of machine learning models, data that includes a game identifier of the game and a set of digital assets of different classes associated with the game;
generating, based on the set of digital assets and by respective models of the plurality of machine learning models, a respective feature vector of a plurality of feature vectors;
generating, based on the plurality of feature vectors, a plurality of predicted text tags for the game, each predicted text tag associated with a respective prediction score;
selecting one or more text tags from the plurality of predicted text tags based on the respective prediction score;
obtaining a developer provided text tag for the game;
validating the developer provided text tag for the game by comparing the developer provided text tag with the one or more selected text tags;
determining that the developer provided text tag is irrelevant based on the comparison; and
removing the developer provided text tag from association with the game.

11. The non-transitory computer-readable medium of claim 10, wherein generating the plurality of predicted text tags comprises selecting from a collection of words associated with a game platform that hosts the game, wherein the selecting is based on the plurality of prediction scores.

12. The non-transitory computer-readable medium of claim 10, wherein at least one of the plurality of machine learning models includes a convolutional neural network (CNN) and wherein the feature vector generated by the at least one of the plurality of machine learning models is based on a set of image assets from the set of digital assets.

13. The non-transitory computer-readable medium of claim 10, wherein the operations further comprise displaying a user interface that includes a list of games associated with at least one of the one or more selected text tags.

14. The non-transitory computer-readable medium of claim 10, wherein the digital assets comprise one or more of game objects, meshes, avatars, game source code, game configuration parameters, game lighting, avatar movements, text content of the game, game sounds, game background music, code coverage, or frequency of use of digital assets during gameplay.

15. The non-transitory computer-readable medium of claim 10, wherein the operations further comprise displaying a user interface that includes the one or more selected text tags along with a game icon associated with the game.

16. A system comprising:
a memory with instructions stored thereon; and
a processing device, coupled to the memory, the processing device configured to access the memory and execute the instructions, wherein the instructions cause the processing device to perform operations to validate one or more text tags for a game comprising:
providing, as input to a plurality of machine learning models, data that includes a game identifier of the game and a set of digital assets of different classes associated with the game;
generating, based on the set of digital assets and by respective models of the plurality of machine learning models, a respective feature vector of a plurality of feature vectors;
generating, based on the plurality of feature vectors, a plurality of predicted text tags for the game, each predicted text tag associated with a respective prediction score;
selecting one or more text tags from the plurality of predicted text tags based on the respective prediction score;
obtaining a developer provided text tag for the game;
validating the developer provided text tag for the game by comparing the developer provided text tag with the one or more selected text tags;
determining that the developer provided text tag is irrelevant based on the comparison; and
removing the developer provided text tag from association with the game.

17. The system of claim 16, wherein generating the plurality of predicted text tags comprises selecting from a collection of words associated with a game platform that hosts the game, wherein the selecting is based on the plurality of prediction scores.

18. The system of claim 16, wherein at least one of the plurality of machine learning models includes a convolutional neural network (CNN) and wherein the feature vector generated by the at least one of the plurality of machine learning models is based on a set of image assets from the set of digital assets.

19. The system of claim 16, wherein the digital assets comprise one or more of game objects, meshes, avatars, game source code, game configuration parameters, game lighting, avatar movements, text content of the game, game sounds, game background music, code coverage, or frequency of use of digital assets during gameplay.

20. The system of claim 16, wherein the operations further comprise training the plurality of machine learning models, wherein the training comprises, for each model:
providing, as input to the model, training data that includes a plurality of game identifiers and a respective set of digital assets of different classes associated with each game identified by the game identifiers;
generating, based on the set of digital assets and by the model, a respective feature vector;

generating, based on the feature vector, a plurality of predicted text tags;

comparing the plurality of predicted tags with respective tags associated with each game identified by the game identifiers; and adjusting one or more parameters of the model based on the comparison of the plurality of predicted tags with respective tags associated with each game identified by the game identifiers.

\* \* \* \* \*